US009823055B2

(12) United States Patent
Cromwell

(10) Patent No.: US 9,823,055 B2
(45) Date of Patent: Nov. 21, 2017

(54) MEASURING DEVICES WITH INTEGRATED MEASUREMENT CONVERSIONS FROM FRACTION-INCHES TO DECIMAL-INCHES AND VICE VERSA

(71) Applicant: Marshall Cromwell, Missoula, MT (US)

(72) Inventor: Marshall Cromwell, Missoula, MT (US)

( * ) Notice: Subject to any disclaimer, the term of this patent is extended or adjusted under 35 U.S.C. 154(b) by 0 days.

(21) Appl. No.: 14/558,927

(22) Filed: Dec. 3, 2014

(65) Prior Publication Data
US 2015/0082644 A1 Mar. 26, 2015

Related U.S. Application Data

(60) Provisional application No. 61/976,590, filed on Apr. 8, 2014.

(51) Int. Cl.
*G01B 3/10* (2006.01)
*G01B 3/00* (2006.01)

(52) U.S. Cl.
CPC ........... *G01B 3/1082* (2013.01); *G01B 3/006* (2013.01)

(58) Field of Classification Search
CPC ............................... G01B 3/1082; G01B 3/006
USPC ......... 33/483, 494, 755, 759, 760, 474, 476, 33/679.1
See application file for complete search history.

(56) References Cited

U.S. PATENT DOCUMENTS

| 2,658,278 | A | | 11/1953 | Debs | |
|---|---|---|---|---|---|
| 3,085,358 | A | | 4/1963 | Hramiec | |
| 4,757,616 | A | * | 7/1988 | Hills | G01B 3/04 33/488 |
| 5,101,569 | A | * | 4/1992 | Watkins | G01B 3/006 33/203 |
| 5,335,421 | A | * | 8/1994 | Jones, Jr. | G01B 3/004 33/494 |
| 5,746,001 | A | | 5/1998 | Fisher | |
| 6,237,243 | B1 | * | 5/2001 | Cook | G01B 3/1082 33/758 |
| 6,243,959 | B1 | | 6/2001 | Monck | |
| 7,076,881 | B1 | | 7/2006 | Perry | |
| 7,415,772 | B1 | * | 8/2008 | Ferretti | G01B 3/04 33/491 |
| 2002/0184776 | A1 | * | 12/2002 | Karageorge | G01B 3/02 33/494 |
| 2003/0154608 | A1 | * | 8/2003 | Khan | B43L 9/04 33/27.03 |

(Continued)

*Primary Examiner* — G. Bradley Bennett
(74) *Attorney, Agent, or Firm* — Global Intellectual Property Agency, LLC; Daniel Enea

(57) ABSTRACT

Disclosed is a measuring device that is adapted for providing conversions from fractions of an inch to decimals of an inch and vice versa. The measuring device includes a ruler having a first edge opposite a second edge. The first edge includes markings for indicating units of measurement in decimals, while the second edge includes markings for indicating units of measurement in fractions. The markings in decimals directly align with corresponding markings in fractions so that the user can determine fraction-decimal equivalents by locating the alignments of the markings. Furthermore, the present invention may be a traditional ruler, a retractable tape measure, a measuring tape, a right angle ruler, or a yard stick, depending upon embodiment.

6 Claims, 3 Drawing Sheets

(56) References Cited

U.S. PATENT DOCUMENTS

| | | | | |
|---|---|---|---|---|
| 2004/0035012 A1* | 2/2004 | Moehnke | ............. | G01B 3/1082 33/494 |
| 2005/0155245 A1* | 7/2005 | Panosian | .............. | G01B 3/1084 33/760 |
| 2007/0124950 A1* | 6/2007 | Wirtz | ................... | G01B 3/1082 33/759 |
| 2007/0271806 A1* | 11/2007 | Dressler | ................... | G01B 3/10 33/758 |
| 2008/0022545 A1* | 1/2008 | Wirtz | ................... | G01B 3/1082 33/759 |
| 2012/0255190 A1* | 10/2012 | Hernandez | ............... | G01B 3/06 33/679.1 |
| 2012/0266471 A1* | 10/2012 | Chao | ......................... | B43L 7/00 33/478 |
| 2013/0008039 A1* | 1/2013 | Schneider | ................ | G01B 3/04 33/494 |
| 2014/0109424 A1* | 4/2014 | Leff | ........................ | G01B 1/00 33/701 |
| 2014/0250708 A1* | 9/2014 | Bauer | .................. | G01B 3/1061 33/760 |
| 2014/0352164 A1* | 12/2014 | Goldstein | .............. | G01B 5/285 33/701 |
| 2015/0016907 A1* | 1/2015 | Frick | ..................... | B23B 47/287 408/115 R |
| 2016/0040971 A1* | 2/2016 | Hoge | ................... | G01B 3/1084 33/701 |

\* cited by examiner

MEASURING DEVICES WITH INTEGRATED MEASUREMENT CONVERSIONS FROM FRACTION-INCHES TO DECIMAL-INCHES AND VICE VERSA

CROSS REFERENCE TO RELATED APPLICATION

This application claims the benefit of U.S. Provisional Application No. 61/976,590 filed on Apr. 8, 2014. The above-identified patent application is herein incorporated by reference in its entirety to provide continuity of disclosure.

BACKGROUND OF THE INVENTION

Field of the Invention

The present invention relates to a handheld measuring device. More specifically, the present invention pertains to an improved ruler with a fraction to decimal converter and vice versa. The ruler comprises markings on a first edge and a second edge thereof. The markings on the first edge represent units of measurement in decimals of inches while the markings on the second edge represent units of measurement in fractions of inches, wherein each marking on the first edge represents a tenth of an inch and each marking on the second edge represents a sixteenth of an inch. In this way, the present invention provides one measuring device that can be used to easily determine fraction-decimal equivalents.

A ruler is a common measuring tool that is designed to measure length. Rulers are ubiquitous, and they are used for various purposes, including tailoring, carpentry, construction, surveying, and the like. Many rulers provide measurements in inches and feet, and these measurements are generally subdivided into fractions. While it is important to provide accurate measurement, it can be inconvenient to measure in fractions because it is more difficult to engage in mathematical computations to add, subtract, multiply, and divide fractions, especially when dealing with different denominators, than it is to do mathematical computations with decimals. Thus, many individuals convert measured lengths from fractions to decimals before conducting mathematical computations.

While some individuals utilize multiple measuring devices to determine fraction-decimal equivalents, it can be inconvenient to utilize multiple measuring devices. Furthermore, individuals may prefer to carry a single measuring device to prevent loss and misplacement of multiple measuring devices while working in different areas. Thus, a single device that increases the ease of converting measured lengths from fractions to decimals, or from decimals to fractions, is desired.

The present invention provides a measuring device that allows users to easily determine fraction-decimal equivalents. In one embodiment, the measuring device comprises a ruler having a first edge opposite a second edge. The first and second edges are parallel to each other, and each of the edges comprises a plurality of markings in a linear configuration. The markings on the first edge of the ruler are spaced apart so that each marking represents a decimal of the unit of measurement. Similarly, the markings on the second edge of the ruler are spaced apart at regular intervals so that each marking represents a fraction of a unit of measurement.

The markings on the first edge and the second edge of the ruler are disposed so that fraction-decimal equivalents of the measurement are directly aligned. In this way, each of the whole units of measurement is aligned. Such markings of the ruler allow users to determine fraction-decimal equivalents without performing mathematical computations. Furthermore, the present invention eliminates the need for the user to use multiple devices to determine measurements in a fraction form or a decimal form.

Description of the Prior Art

Devices have been disclosed in the prior art that claim measuring devices that provide measurements in fractions or decimals. These include devices that have been patented and published in patent application publications, and generally relate to teaching rulers that include measurements in fractions or measurements in decimals. The prior art devices, however, do not disclose a ruler with a first edge having measurements in decimals and a second edge having measurements in fractions. The foregoing is a list of devices deemed most relevant to the present disclosure, which are herein described for the purposes of highlighting and differentiating the unique aspects of the present invention, and further highlighting the drawbacks existing in the prior art.

Some devices in the prior art disclose a set of rulers that can be used together to compare different units of measurements. U.S. Pat. No. 6,243,959 to Monck discloses a measuring device comprising a set of transparent rulers that are stacked and bound together so that the edges of the rulers align. Each of the rulers comprises markings based on different units of measurement. In this way, different rulers can be aligned to demonstrate the relationship between one unit of measurement and another unit of measurement. U.S. Pat. No. 3,085,358 to Hramiec discloses teaching rulers that are pivotally attached together, wherein each of the rulers comprises different units of measurement.

The foregoing Monck and Hramiec devices, however, are limited in the fact that multiple rulers must be used together in order for the user to compare different units of measurements. In contrast, the present invention provides one ruler that can be used to convert units of measurements from fractions to decimals, and vice versa. Thus, the present invention does not require the user to use multiple rulers at one time.

Similarly, U.S. Pat. No. 2,658,278 to Victor discloses a ruler having a first section that is pivotally attached to a second section. The first section comprises opposing edges with markings for indicating different units of measurement. As such, one edge comprises one unit of measurement, and the opposite edge comprises another unit of measurement. Thus, Victor does not disclose a device that allows the user to convert measurements from fractions to decimals.

U.S. Pat. No. 5,746,001 to Fisher and U.S. Pat. No. 7,076,881 to Perry disclose rulers that include a scale that is divided into a series of repeat basic measurement units. Each scale is arranged adjacent to the next smaller scale so that each succeeding scale is arranged between a larger and smaller scale. These devices, however, do not provide a means to convert measurements in fractions to decimals, and vice versa.

The devices disclosed in the prior art have several known drawbacks. These devices are limited in that they do not allow the user to convert measurement from fractions to decimals using one ruler. The present invention overcomes these limitations by disclosing a ruler with markings in fractions of a unit of measurement on one edge and markings in decimals of a unit of measurement on the opposite edge. The markings on opposing edges of the ruler are aligned so that the measurements in fractions directly align with corresponding measurements in decimals. Thus, the user can determine a fractional equivalent of a decimal by locating the markings that are aligned. Additionally, the present invention comprises an elongated ruler, a retractable measure, a measuring tape, a right angle ruler, or a yard stick, depending upon embodiment.

It is therefore submitted that the present invention is substantially divergent in design elements from the prior art, and consequently it is clear that there is a need in the art for an improvement to measuring devices that provide measurements in fractions or decimals of an inch. In this regard, the instant invention substantially fulfills these needs.

SUMMARY OF THE INVENTION

In view of the foregoing disadvantages inherent in the known types of measuring devices that provide measurements in fractions or decimals now present in the prior art, the present invention provides a new and improved measuring device with integrated measurement conversion wherein the same can be utilized for increasing the ease of converting measurement from fractions of an inch to decimals of an inch.

It is therefore an object of the invention to provide a new and improved measuring device with integrated measurement conversion that has all of the advantages of the prior art and none of the disadvantages.

Another object of the present invention is to provide a new and improved measuring device with integrated measurement conversion having a first edge and a second edge, wherein the first edge comprises markings in decimals of an inch and the second edge comprises markings in fractions of an inch.

Yet another object of the present invention is to provide a new and improved measuring device with integrated measurement conversion that comprises measurements in fractions that align with corresponding measurements in decimals.

Yet another object of the present invention is to provide a new and improved measuring device with integrated measurement conversion that provides measurement in both fractions of inches and decimals of inches in tenths of an inch increments.

Still yet another object of the present invention is to provide a new and improved measuring device with integrated measurement conversion that is in a form of a tape measure, a right angle ruler, or a conventional ruler, among other measuring devices.

Still yet another object of the present invention is to provide a new and improved measuring device with integrated measurement conversion wherein the device may be readily fabricated from materials that permit relative economy and are commensurate with durability.

Other objects, features, and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein the numeral annotations are provided throughout.

DETAILED DESCRIPTION OF THE INVENTION

Figure 1:
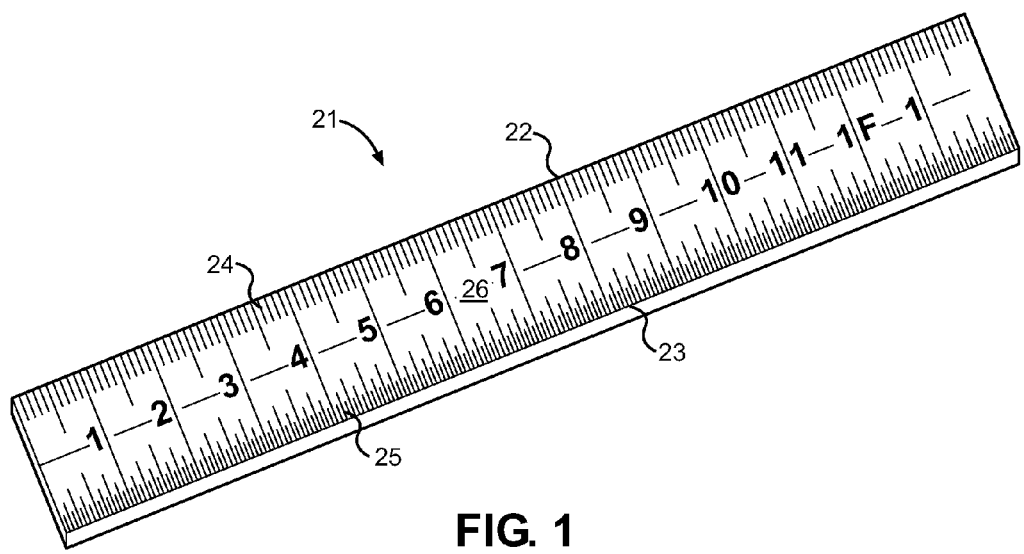
FIG. 1 shows a perspective view of a first embodiment of the present invention.

References are made herein to the attached drawings. Like reference numerals are used throughout the drawings to depict like or similar elements of the measuring device with integrated measurement conversion. For the purposes of presenting a brief and clear description of the present invention, the preferred embodiment will be discussed as used to increase the ease of converting measurement from fractions to decimals. The figures are intended for representative purposes only and should not be considered to be limiting in any respect.

Figure 2:
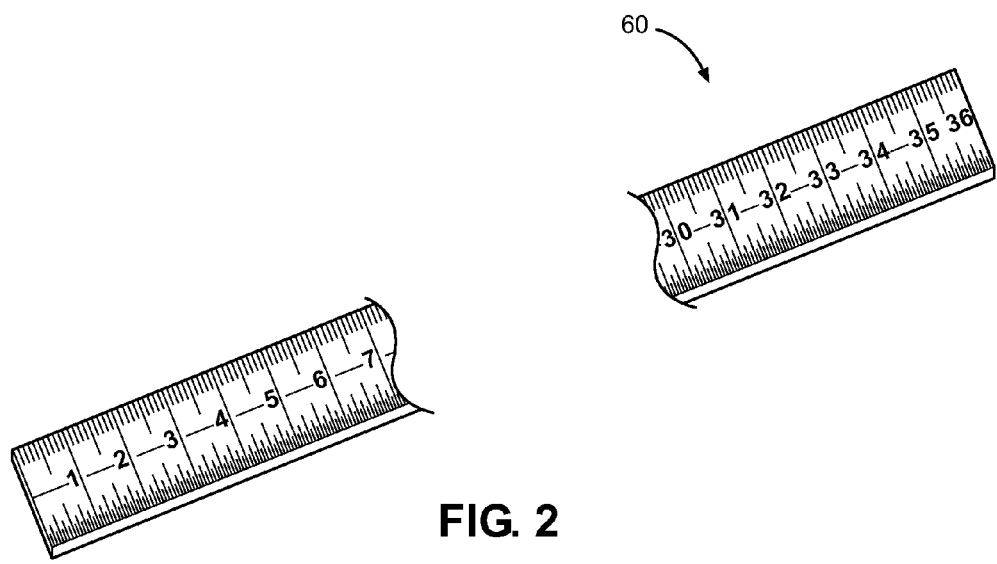
FIG. 2 shows a perspective view of a second embodiment of the present invention.

Referring now to FIGS. 1 and 2, there are shown perspective views of a first and second embodiments of the present invention. The present invention comprises a one-foot ruler 21 as shown in FIG. 1, or a yard stick 60 as shown in FIG. 2. Each of the ruler 21 and the yard stick 60 includes a top surface 26 with a defined first edge 22 opposite a second edge 23. The first edge 22 is parallel to the second edge 23, and in one embodiment, each of the edges 22, 23 comprises a leading edge or a beveled edge for facilitating handling thereof. In the illustrated embodiment of the present invention, the ruler 21 and the yard stick 60 comprise markings that repeat basic measurement unit in one inch on the top surface 26. Each inch unit is annotated by a number below each respective marking on the top surface 26. The markings and annotations on the ruler 21 and the yard stick may be printed or etched on the top surface 26 thereof.

The first edge 22 comprises a plurality of markings 24 thereon. The markings 24 provide measurements in decimals. The markings 24 on the first edge 22 are subdivided in tenths of an inch increments. Accordingly, every tenth marking 24 comprises an inch. Each of the markings that indicates a tenth of an inch is equal in length. Additionally, each of the markings that indicates one half of an inch is equal in length. Finally, each of the markings that indicates a whole inch is equal in length. The markings 24 that indicate a tenth of an inch is shorter in length compared to the markings that indicate one half of an inch, which is shorter in length compared to the markings that indicate a whole inch.

The second edge 23 comprises a plurality of markings 25 thereon. In the illustrated embodiment, the markings 25 provide measurements in fractions of an inch. The markings 25 on the second edge 23 are subdivided in ¹⁄₁₆ inch increments. Accordingly, every sixteenth marking 25 comprises an inch. Each of the markings that indicates one sixteenth of an inch, three sixteenth of an inch, five sixteenth of an inch, seven sixteenth of an inch, nine sixteenth of an inch, eleven sixteenth of an inch, thirteen sixteenth of an inch, and fifteen sixteenth of an inch is equal in length. Additionally, each of the markings that indicates one eighth of an inch, three eighth of an inch, five eighth of an inch, and seven eighth of an inch comprises a same length. Similarly, each of the markings that indicate one fourth of an inch and three fourth of an inch comprises a same length, and each of the markings that indicate one half of an inch comprises a same length. Finally, every marking 25 that indicates a whole inch comprises a same length. The markings 25 that indicate a whole inch are greater in length compared to markings that indicate one half of an inch. In turn, the markings that indicate one half of an inch are greater in length compared to each of the markings that indicates one fourth of an inch, and so forth.

The markings 24, 25 are aligned with each other so that the markings that indicate measurements in fractions is directly aligned with markings that indicate corresponding measurements in decimals. For example, markings 24 that indicate every one half of an inch are directly aligned with markings 25 that indicate every one half of an inch. The alignment of markings 24, 25 for measurements in fractions and decimals allow the user to easily determine fraction-decimal equivalents, and thus convert measurements from fractions to decimals, and vice versa.

Figure 3:
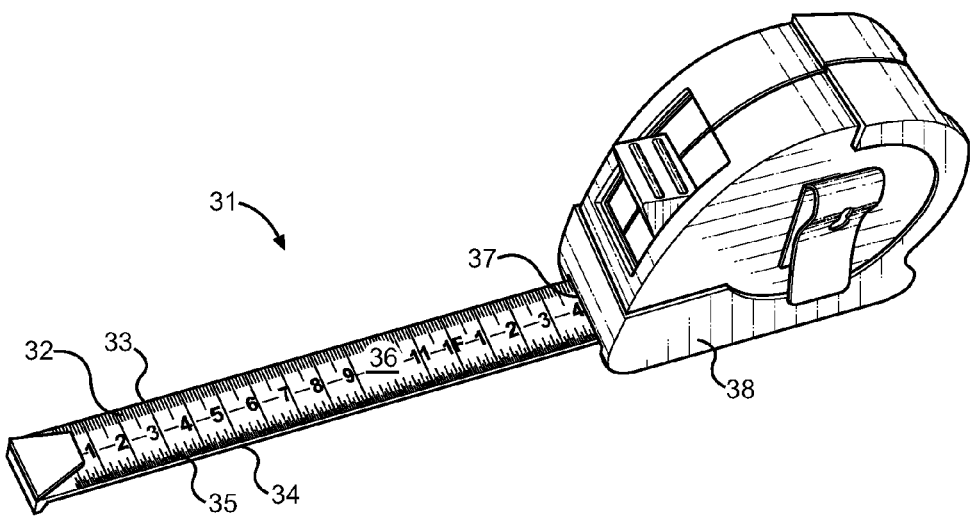
FIG. 3 shows a view of a third embodiment of the present invention.

FIG. 3 shows a perspective view of a third embodiment of the present invention. The retractable tape measure 31 of the second embodiment comprises a housing member 38 comprising a coiled measuring tape that is located in the interior volume thereof. It is contemplated that the tape is coiled around a spring biased reel that is disposed in the interior volume of the housing member 38. The tape can be extended from and retracted into the housing member 38 through an opening 37. The coiled tape includes a free end with a pull tab secured thereto. The housing member 38 further comprises a stopping mechanism for locking the tape in an extended position, and a clip for securing the housing member 38 to a mounting surface. The stopping mechanism can be actuated and released via a switch or a rocker. When the stopping mechanism is released, the tape is automatically retracted into the housing member 38.

The measuring tape of the tape measure 31 includes a top surface 36 having a first edge 33 and a second edge 34. The measuring tape is composed of flexible steel, or other semi-rigid material that can be extended into a straight configuration, but also flexible to be coiled around a reel. The measuring tape repeats a basic measurement unit of one inch. Every inch mark extends between the first edge 33 and the second edge 34 of the tape. Additionally, each marking that indicates a whole inch includes a corresponding number measurement adjacent thereto.

The first edge 33 of the tape 31 includes markings 32 that provide measurement in decimals. Each marking 32 indicates tenths of an inch. Thus, every tenth mark indicates a whole inch. Every marking 32 that indicate one half of an inch is longer than each of the markings 32 that indicate one tenth of an inch. Additionally, each of the markings 32 that indicates one half of an inch directly align with markings 35 that indicate one half of an inch.

The second edge 34 of the tape 31 includes markings 35 that provide measurement in fractions. Each marking 35 indicates one sixteenth of an inch so that every sixteenth mark indicates a whole inch, which extends between the first edge 33 and the second edge 34. Each marking 35 that indicates one half of an inch is longer than each of the one-fourth, one-eighth, and one-sixteenth inch markings 35 so as to allow the user to easily locate a half way mark of an inch.

Figure 4:
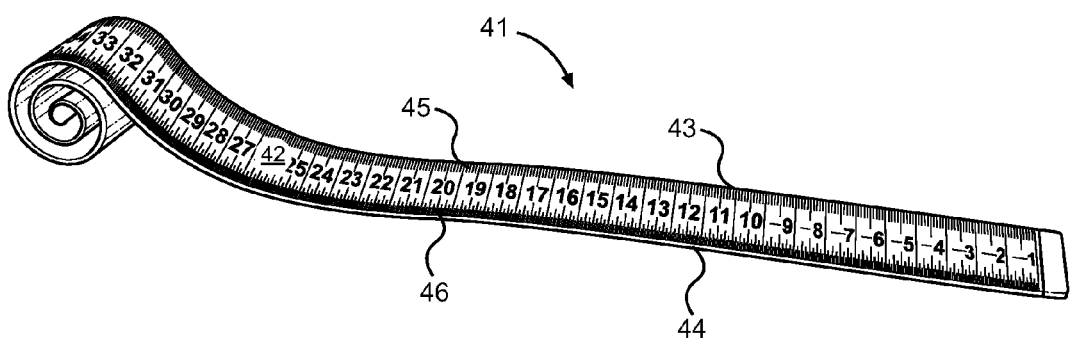
FIG. 4 shows a view of a fourth embodiment of the present invention.

Alternatively, the present invention may comprise a conventional measuring tape 41 that is not retractable, as shown in FIG. 4. The measuring tape 41 of the present invention comprises a flexible ruler that is composed of non-stretchable material, such as fiberglass. The ruler 41 has two terminal ends, each of the terminal ends having a metal tip attached thereto. The ruler 41 has a top surface 42 and a first edge 43 opposite a second edge 44. Each of the first edge 43 and the second edge 44 comprises a plurality of markings 45, 46, respectively. The markings 45 on the first edge 43 of the ruler 41 provide measurements in decimals, while the markings 46 on the second edge 44 of the ruler 41 provide measurements in fractions.

Figure 5:
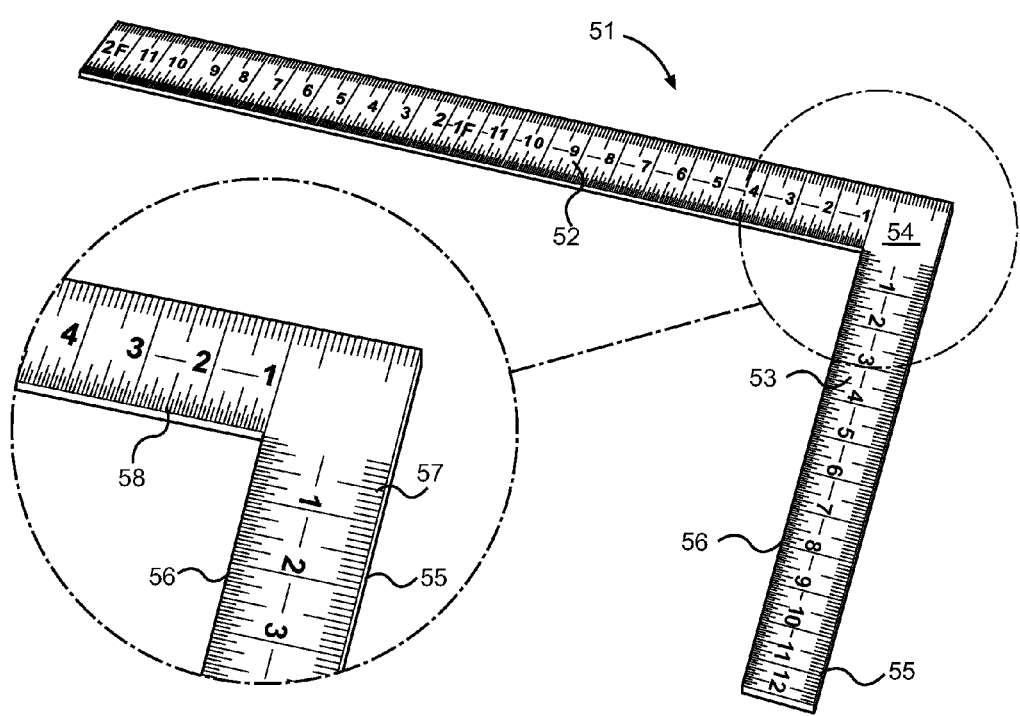
FIG. 5 shows a view of a fifth embodiment of the present invention.

FIG. 5 shows a view of a fifth embodiment of the present invention. The illustrated embodiment of the present invention comprises a right angle ruler 51 having a first section 52 that is perpendicular to the second section 53. The first section 52 and the second section 53 are integrally formed so that the ruler 51 is unitary in structure, and the two sections 52, 53 share a top surface 54 with a defined first edge 55 opposite a second edge 56 so that the first edge 55 is the outside edge and the second edge 56 is the inside edge. The ruler 51 may be composed of metal or other suitable material. Additionally, the ruler 51 may comprise a padded underside. The padding may comprise a layer of foam or the like, wherein the padding is attached to the underside of the ruler 51 by means of strong adhesives.

As described above, the first edge 55 of the ruler 51 comprises markings 57 in increments of tenths of an inch, and the second edge 56 of the ruler 51 comprises markings 58 in increments of sixteenths of an inch. Each of the markings 57, 58 is disposed in a linear configuration along the edges 55, 56. The first edge 55 of the ruler 51 may be labeled to indicate that the measurements are provided in decimals, and the second edge 56 of the ruler 51 may be labeled to indicate that the measurements are provided in fractions.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above descriptions then, it is to be realized that the optimum dimensional relationships for the parts of the invention, to include variations in size, materials, shape, form, function, and manner of operation, assembly and use, are deemed readily apparent and obvious to one skilled in the art, and all equivalent relationships to those illustrated in the drawings and described in the specifications are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A measuring device, comprising:
    an elongated ruler having a first edge opposite a second edge, the elongated ruler including a continuous upper surface, the continuity of the upper surface extending from the first edge to the opposing second edge;
    the first edge including a first plurality of markings divided into inch increments, each of the first plurality of markings further divided into tenth of an inch increments;
    wherein the first plurality of markings include a marking disposed in each of the inch increments configured to denote a half of an inch in the inch increment in which it is disposed;
    the second edge including a second plurality of markings divided into inch increments, each of the second plurality of markings divided into eighth of an inch increments;

the second plurality of markings including a marking disposed in each of the inch increments configured to denote an eighth of an inch in the inch increment in which it is disposed;

wherein each of the tenth of an inch increments represents a decimal value of an inch;

wherein each of the eighth of an inch increments represents a fraction value of an inch;

wherein the tenth of an inch increments and the eighth of an inch increments are aligned and correspond to one another, such that a decimal value of an inch measured by the first edge of the ruler can be converted to its fraction value of an inch equivalent by referring to its corresponding fraction value on the second edge of ruler.

2. The measuring device of claim 1, wherein said elongated ruler comprises a measuring tape.

3. The measuring device of claim 1, wherein said elongated ruler comprises a retractable tape measure.

4. The measuring device of claim 1, wherein said elongated ruler comprises a right angle ruler.

5. The measuring device of claim 1, wherein the second plurality of markings include a second marking disposed in each of the inch increments configured to a quarter of an inch in the inch increment in which it is disposed.

6. The measuring device of claim 5, wherein the second plurality of markings include a third marking disposed in each of the inch increments configured to denote a half of an inch in the inch increment in which it is disposed.

* * * * *